3,344,196
HYDROGENATION OF ALKANOIC DICARBOXYL-
IC ACIDS USING SINTERED COBALT CATALYST
Hubert Corr, Erich Haarer, and Paul Hornberger, Lud-
wigshafen (Rhine), Germany, assignors to Badische
Anilin- & Soda-Fabrik Aktiengesellschaft, Bundesrepub-
lik Deutschland
No Drawing. Filed June 2, 1964, Ser. No. 372,111
Claims priority, application Germany, May 18, 1960,
B 57,889
6 Claims. (Cl. 260—635)

This application is a continuation-in-part of our co-pending application Serial No. 109,873, filed May 15, 1961, and now abandoned.

This invention relates to a process for the hydrogenation of alkanedicarboxylic acids to the corresponding alcohols. More specifically, it relates to the hydrogenation of such compounds in aqueous solutions.

It is known that organic carboxylic acid or their esters can be hydrogenated with hydrogen at elevated temperatures and at atmospheric or increased pressure in the presence of sulfur-sensitive heavy metals, such as copper, iron, cobalt and nickel. The catalysts are usually obtained by reduction of oxygen compounds of the said metals and used in molded form, in powder form or deposited on carriers.

The prior art catalysts either give low yields or they possess high activity for only a short period. Others cannot be used in the presence of the free acids so that it is necessary first to prepare the esters of the acids. Furthermore, the known catalysts have only little mechanical strength, and this gives rise to many disturbances, especially when working in the liquid phase. Hydrogenation catalysts are also known which contain sulfur and are therefore not sulfur-sensitive, as for example molybdenum sulfide. Such catalysts lose their activity relatively quickly.

It is further known that hydroxycarboxylic acids such as glycolic acid can be hydrogenated in alcoholic solutions in the presence of a copper catalyst. In this process the acid must be isolated and then dissolved in the alcohol. No catalyst is known which allows dicarboxylic acid to be hydrogenated in free form in aqueous solution.

It is an object of the present invention to provide a process for the hydrogenation of alkanoic dicarboxylic acids which can be carried out in aqueous phase. Another object of the invention is to provide a process according to which alkanoic dicarboxylic acids can be hydrogenated to the corresponding alcohols with long operational periods.

According to the present invention the said objects are achieved by hydrogenating alkanoic dicarboxylic acids dispersed in an aqueous medium in the presence of a catalyst which contains as an essential constituent, cobalt and which has been prepared by sintering prior to the hydrogenation. The hydrogenation according to the new process is carried out at elevated temperature and under increased pressure.

The expression "prepared by sintering" means heating the catalyst to a temperature which is not high enough to melt the catalyst but high enough to unite the particles in order to reduce the surface area and to improve the mechanical strength.

The advantages of the new process are the possibility to hydrogenate alkanoic dicarboxylic acids in aqueous solution or suspension and the long life of the catalyst the activity of which remains consistently high over long periods, so that in a continuous process the catalyst has to be replaced very rarely. It is surprising that sintered catalysts should have a high activity in spite of their catalytically active surface being very much smaller than that of the prior art catalysts.

The process may be used for the reduction of any alkanoic dicarboxylic acids. It is especially suitable for the hydrogenation of alkanoic dicarboxylic acids with 3 to 12 carbon atoms, malonic acid, succinic acid, glutaric acid, adipi acid, pimelic acid, suberic acid, sebacic acid and decamethylene dicarboxylic acid. It lends itself admirably to the hydrogenation of a mixture of alkanoic acids which is obtained by washing with water the oxidation product obtained by bubbling air through cyclohexane in the presence of an oxidation catalyst at elevated temperature (air oxidation of cyclohexane) or a mixture obtained by air oxidation of cyclooctane or cyclododecane.

As a rule, pure or technically pure hydrogen is used, but it is also possible to use gases rich in hydrogen, such as coke oven gas, watergas or town gas.

To carry out the process, the initial material in aqueous solution or suspension is in general led over the catalyst at 150° to 300° C., especially at 200° to 250° C., in the presence of hydrogen. 5 to 50% solutions or suspensions are preferred. The hydrogen may be led concurrent or countercurrent to the initial material. The process may be carried out at normal pressure, but in order to increase the reaction velocity it is preferred to apply increased pressure, for example 5 to 500 atmospheres, especially 50 to 350 atmospheres. The pressure and the temperature are so correlated that a liquid phase is present in the reaction chamber.

The catalysts used consist essentially of cobalt, but may also contain up to 20% of copper. The catalysts may be prepared for example by sintering the powdered cobalt or the cobalt/copper mixture, if desired in admixture with carrier substances such as pumice, alumina, kieselguhr, silica gel, synthetic or natural silicates, porcelain or quartz, at temperatures which advantageously lie only slightly, for example 20° to 100° C., below the melting point of the cobalt (M.P. 1,480) or the cobalt/copper mixture.

Especially favorable results are achieved by starting from oxygen compounds of the cobalt or the cobalt/copper mixture. The oxides of the said metals or other oxygen compounds which are converted into the oxides at the latest at the sintering temperature, such as hydroxides, carbonates, nitrates or nitrites, are heated, preferably in the presence of atmospheric oxygen, to temperatures above 600° C., preferably above 800° C. Although the initial materials for the production of the catalysts may be heated up to the melting point, it is preferable to effect sintering at a temperature which is 20° to 60° C. below the melting temperature of the metal compound. Since the metal oxides in question have high melting points, the preferred sintering temperatures lie between 800° and 1400° C., especially between 1000° and 1400° C. The above-mentioned carrier substances may also be incorporated with this method of preparation. Moreover, addition of promoters, such as alkali or alkaline earth compounds, titanium dioxide or compounds of metals of groups V and VI of the Periodic System, is also recommendable in many cases.

The duration of the sintering depends on the temperature chosen. In general, it is at least half an hour, preferably one to five hours. The sintered oxide or oxides are then treated with hydrogen at temperatures between 250° to 600° C., advantageously between about 350° and about 400° C. until the oxide has been practically completely reduced to metal. If the hyrdogen treatment is carried out under pressure, for example at 10 to 60 atmospheres, lower temperatures, for example 250° to 370° C. may be applied. In some cases it is of advantage to carry out the reduction in the reaction vessel in which the hydrogenation of the dicarboxylic acid is to be carried out so that the catalyst does not come into contact with atmospheric oxygen.

The process is conveniently carried out continuously. Since the catalysts have very good mechanical strength, they are especially suitable for use in a process in which the aqueous solution of the initial material is led together with hydrogen downwardly over the catalyst arranged in a reaction tube. The high mechanical strength of the catalysts however also permits variations of the process in which the catalyst is kept in vigorous movement in the reaction chamber.

The invention is illustrated by, but not limited to, the following examples.

Example 1

A 0.6–1 heatable pressure-tight and acid-proof reaction vessel is filled with pellets 6 mm. in diameter which consist of cobalt oxide sintered for one hour at 1050° C. Hydrogen under normal pressure is led through the reaction vessel at 400° C. until no further water is formed. Then the catalyst is allowed to cool to 240° C. in a current of hydrogen. 7 kilograms per hour of an aqueous adipic acid solution saturated at 20° C. and having an acid number of 34 is led at 240° C. together with 2000 liters of hydrogen at a pressure of 280 atmospheres over the said catalyst. The reaction mixture leaving the reaction chamber has an acid number of 0.2 and an ester number of 0.05. After separating the water by distillation, there is obtained per hour 225 grams of hexane-diol-(1,6) which boils at 156° C. at 10 mm. Hg (hydroxyl number 950). This is 94% of the theoretical yield.

Example 2

At 245° C. and at a pressure of 280 atmospheres, 100 grams per hour of a 40% aqueous glutaric acid solution is led over the catalyst described in Example 1 together with 150 liters of hydrogen. The acid number of the initial solution is 340 and that of the reaction product obtained is 0.15. By working up the reaction mixture by distillation, 36.5 grams of pentane-diol-(1,5) of the boiling point 239° C. is obtained per hour with a hydroxyl number of 1072; this is a yield of 92.6%.

Example 3

At 220° C., 200 liters (N.T.P.) of hydrogen per hour is passed over the catalyst described in Example 1 at a pressure of 300 atmospheres together with 1 kilogram of an aqueous solution of an acid mixture which has been obtained by washing with water a crude oxidation product from the oxidation of cyclohexane with air. The solution consists of 63% by weight of water and 37% by weight of organic substance. The organic substance has an acid number of 595, an ester number of 65, a hydroxyl number of 58 and a carboxyl number of 100. The aqueous solution leaving the reaction chamber has an acid number of 2. The water is removed by vacuum distillation. A fraction remains which boils at 150° to 155° C. at 15 mm. Hg, solidifies at room temperature and has a hydroxyl number of 942. It consists mainly of hexane-diol-(1,6), some pentane-diol-(1,5) and traces of butane-diol-(1,4). 210 grams of the said diol fraction is obtained per hour. After operation for 5000 hours, the activity of the catalyst is unchanged.

If the reaction and working up are carried out under the same conditions but using a catalyst as described in U.S. Patent 2,285,448, i.e., consisting of 90 mole percent of copper oxide and 10 mole percent of magnesium oxide, a reaction product having an acid number of 93 is obtained.

By distillation under subatmospheric pressure 120 g. of a fraction is obtained which boils between 150° and 155° C. at 15 mm. Hg and which solidifies at room temperature. It has a hydroxyl number of 955 and an ester number of 6 and consists essentially of hexane-diol-(1,6), some pentane-diol-(1,5) and traces of butane-diol-(1,4).

We claim:

1. A process for the hydrogenation of an alkanedioic acid containing 3 to 12 carbon atoms to the corresponding alcohol which comprises contacting said alkanedioic acid dispersed in water at a temperature between 150° and 300° C. and a pressure between 5 and 500 atmospheres with elementary hydrogen in contact with a catalyst selected from the group consisting of cobalt and a mixture of cobalt and copper with a copper content of up to 20% which has been obtained by sintering at a temperature above 600° C.

2. A process as claimed in claim 1 in which the catalyst is supported on a carrier.

3. A process as claimed in claim 1 in which the catalyst has been prepared by sintering an oxide selected from the group consisting of oxides of cobalt and mixture of oxides of cobalt and of oxides of copper, in contact with atmospheric oxygen at a temperature between 1000° and 1400° C., and by treatment of the sintered oxide with hydrogen at a temperature between 250° and 600° C.

4. A process for the hydrogenation of an aqueous mixture of an alkanedioic acid containing 3 to 12 carbon atoms which has been obtained by washing a crude oxidation product from the oxidation of cyclohexane with air which comprises contacting the said aqueous mixture of alkanedioic acids at a temperature between 150° and 300° C. and a pressure between 5 and 500 atmospheres with elementary hydrogen in the presence of a catalyst selected from the group consisting of cobalt and a mixture of cobalt and copper with a copper content of up to 20% which has been obtained by sintering at a temperature above 600° C.

5. A process as claimed in claim 4 in which the catalyst is supported on a carrier.

6. A process as claimed in claim 4 in which the catalyst has been prepared by sintering an oxide selected from the group consisting of oxides of cobalt and mixtures of oxides of cobalt and of oxides of copper, in contact with atmospheric oxygen at a temperature between 1000° and 1400° C., and by treatment of the sintered oxide with hydrogen at a temperature between 250° and 600° C.

References Cited

UNITED STATES PATENTS

| | | | |
|---|---|---|---|
| 2,285,448 | 6/1942 | Loder | 260—638 |
| 2,322,099 | 6/1943 | Schmidt | 260—635 |
| 2,607,805 | 8/1952 | Gresham | 260—635 |

LEON ZITVER, *Primary Examiner.*

J. E. EVANS, *Assistant Examiner.*